(12) United States Patent
Chen et al.

(10) Patent No.: US 12,659,373 B2
(45) Date of Patent: Jun. 16, 2026

(54) REAL-TIME LOCATING SYSTEM EMPLOYING AN ULTRA-WIDE BAND SENSOR NETWORK

(71) Applicant: GM Global Technology Operations LLC, Detroit, MI (US)

(72) Inventors: Jinzhu Chen, Troy, MI (US); Zijun Han, Rochester Hills, MI (US); Fan Bai, Ann Arbor, MI (US); Aaron Adler, Rochester Hills, MI (US); Lakshmi V. Thanayankizil, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 148 days.

(21) Appl. No.: 18/830,917

(22) Filed: Sep. 11, 2024

(65) Prior Publication Data

US 2026/0075107 A1 Mar. 12, 2026

(51) Int. Cl.
H04L 67/12 (2022.01)
G01S 5/14 (2006.01)
H04L 41/0806 (2022.01)

(52) U.S. Cl.
CPC ................ H04L 67/12 (2013.01); G01S 5/14 (2013.01); H04L 41/0806 (2013.01)

(58) Field of Classification Search
CPC ........ H04L 67/12; H04L 41/0806; G01S 5/14
See application file for complete search history.

(56) References Cited

U.S. PATENT DOCUMENTS

| | | | |
|---|---|---|---|
| 2023/0339321 A1* | 10/2023 | Diewald | ................ B60K 35/80 |
| 2024/0235778 A1* | 7/2024 | Keating | ................ H04W 24/08 |
| 2024/0298141 A1* | 9/2024 | Hawawini | ............. H04W 4/023 |

FOREIGN PATENT DOCUMENTS

DE 102022109633 A1 10/2023

* cited by examiner

*Primary Examiner* — Brian Whipple
(74) *Attorney, Agent, or Firm* — Vivacqua Crane, PLLC

(57) ABSTRACT

A real-time locating system determining a location of a target object located in an interior cabin or an environment surrounding a vehicle includes an ultra-wide band (UWB) sensor network including one or more anchors mounted to the vehicle that are in wireless communication with a tag mounted to the target object. The real-time locating system also includes one or more controllers that are part of the vehicle that support a specific connectivity standard that allows two or more Internet of Things (IoT) devices to communicate with one another. The real-time locating system also includes one or more sub-network controllers in electronic communication with the one or more controllers or, alternatively, one or more bridge controllers that are part of the vehicle and are in electronic communication with the one or more controllers by a vehicle communication network.

20 Claims, 4 Drawing Sheets

REAL-TIME LOCATING SYSTEM EMPLOYING AN ULTRA-WIDE BAND SENSOR NETWORK

INTRODUCTION

The present disclosure relates to a real-time locating system that employs an ultra-wide band sensor network for determining the location of a target object.

Matter is an open-source connectivity standard developed by the Connectivity Standards Alliance (CSA) that allows for various smart home and Internet of Things (IoT) devices from different manufacturers to communicate with one another. The current Matter standard supports some types of short-range wireless networking protocols such as, for example, a wireless networking protocol based on the Institute of Electrical and Electronics Engineers (IEEE) 802.11 family of standards or a low-power mesh networking protocol based on the IEEE 802.15 family of standards. However, the current Matter connectively standard does not currently support ultra-wide band (UWB) networks.

A UWB sensor network may be used to determine the location of objects such as people, devices, and assets with a relatively high degree of accuracy. UWB sensor networks include one or more anchors in wireless communication with a tag, where the tag is mounted to a target object. Real-time locating systems (RTLS), which are also referred to as real-time tracking systems, may employ a UWB sensor network to track the location of the target object in real time within a building, vehicle, or other type of contained area. For example, a real-time locating system may be used to provide various features in a vehicle such as digital key and indoor navigation. It is to be appreciated that a vehicle may employ the Matter connectivity standard to allow for various IoT devices to communicate with one another as well. However, as mentioned above, the current Matter connectively standard does not support committing a group of smart wireless sensors that cooperatively provide localization services, which limits the number of options and features that a vehicle may include.

Thus, while current real-time locating systems achieve their intended purpose, there is a need in the art for an approach to integrate a Matter compliant real-time locating system that employs a UWB sensor network to determine the location of a target object.

SUMMARY

According to several aspects, a real-time locating system determining the location of a target object located in an interior cabin or an environment surrounding a vehicle is disclosed. The real-time locating system includes an ultra-wide band (UWB) sensor network including one or more anchors mounted to the vehicle that are in wireless communication with a tag mounted to the target object, where each anchor sends and receives sensor signals that indicate real-time distances between each anchor and the tag. The real-time locating system also includes one or more controllers that are part of the vehicle that support a specific connectivity standard that allows two or more Internet of Things (IoT) devices to communicate with one another, and one or more sub-network controllers in electronic communication with the one or more controllers, where a secure communication sub-network exists between the one or more sub-network controllers and each anchor and the tag that are part of the UWB sensor network based on a secure network communication protocol. The one or more sub-network controllers include one or more processors that execute a sub-network commissioning that includes establishing the secure communication sub-network between the one or more sub-network controllers and each anchor and the tag that are part of the UWB sensor network. The sub-network commissioning includes performing sub-network provisioning between each anchor and the tag that are part of the UWB sensor network, where the sub-network provisioning includes configuring each anchor and the tag based on a plurality of sub-network provisioning parameters. In response to determining each anchor and the tag are configured based on the plurality of sub-network provisioning parameters, the sub-network commissioning includes allowing each anchor and the tag that are part of the UWB sensor network to join the secure communication sub-network.

In an aspect, the plurality of sub-network provisioning parameters includes the following: a two-way ranging protocol configuration, a role configuration, a network configuration, a backbone network communication protocol for the secure communication sub-network, and a communication channel.

In another aspect, the plurality of sub-network provisioning parameters includes one or more of the following: an application layer protocol, a ranging interval, a communication channel, a ranging role, and any relevant network certificates required for communication between the one or more sub-network controllers and the one or more anchors or the tag.

In yet another aspect, the specific connectivity standard is the Matter open-source connectivity standard.

In an aspect, the one or more sub-network controllers and the UWB sensor network both represent an aftermarket system that a consumer purchases separately from the vehicle.

In another aspect, the secure network communication protocol between the one or more sub-network controllers and each anchor and the tag that are part of the UWB sensor network is either a short-range wireless networking protocol or a wired networking protocol.

In yet another aspect, the short-range wireless networking protocol is one of the following: the Institute of Electrical and Electronics Engineers (IEEE) 802.11 family of standards, a low-power mesh networking protocol based on the IEEE 802.15 family of standards, and a UWB short-range wireless networking protocol.

In an aspect, the short-range wireless networking protocol is the Ethernet family of computer networking technologies.

In another aspect, the one or more controllers include one or more processors that execute instructions to perform network commissioning to establish a secure communication network between the one or more controllers and the one or more sub-network controllers.

In yet another aspect, the network commissioning includes: establishing, by the one or more controllers, the secure communication network with the one or more sub-network controllers based on either a short-range wireless networking protocol or a wired connection protocol.

In an aspect, the network commissioning includes: performing network provisioning with the one or more sub-network controllers, where the network provisioning includes selecting an operational network configuration and configuring an internet protocol (IP) over a selected operational network configuration.

In another aspect, the network commissioning includes: registering an application programming interface (API) service corresponding to the UWB sensor network with the vehicle, and providing the vehicle with access control to the UWB sensor network.

In yet another aspect, establishing the secure communication sub-network includes: receiving a broadcast message from each anchor and the tag that are part of the UWB sensor network, in response to receiving the broadcast message from each anchor and the tag that are part of the UWB sensor network, correlate each broadcast message received with the corresponding anchor or tag that is part of the UWB sensor network based on node matching, and exchange security information with each anchor or the tag that is part of the UWB sensor network to establish the secure communication sub-network between each anchor and the tag.

In an aspect, a real-time locating system determining a location of a target object located in an interior cabin or an environment surrounding a vehicle is disclosed. The real-time locating system includes a UWB sensor network including one or more anchors mounted to the vehicle that are in wireless communication with a tag mounted to the target object, where each anchor sends and receives sensor signals that indicate real-time distances between each anchor and the tag. The real-time locating system also includes one or more controllers that are part of the vehicle that support a specific connectivity standard that allows two or more IoT devices to communicate with one another, and one or more bridge controllers that are part of the vehicle and are in electronic communication with the one or more controllers by a vehicle communication network, where a secure communication sub-network exists between the one or more bridge controllers and each anchor and the tag that are part of the UWB sensor network based on a secure network communication protocol. The one or more bridge controllers include one or more processors that execute a sub-network commissioning that includes establishing the secure communication sub-network between the one or more bridge controllers and each anchor and the tag that are part of the UWB sensor network. The sub-network commissioning includes performing sub-network provisioning between each anchor and the tag that are part of the UWB sensor network, where the sub-network provisioning includes configuring each anchor and the tag based on a plurality of sub-network provisioning parameters. In response to determining each anchor and the tag are configured based on the plurality of sub-network provisioning parameters, the sub-network commissioning includes allowing each anchor and the tag that are part of the UWB sensor network to join the secure communication sub-network.

In another aspect, the plurality of sub-network provisioning parameters includes the following: a two-way ranging protocol configuration, a role configuration, a network configuration, a backbone network communication protocol for the secure communication sub-network, and a communication channel.

In yet another aspect, the plurality of sub-network provisioning parameters includes one or more of the following: an application layer protocol, a ranging interval, a communication channel, a ranging role, and any relevant network certificates required for communication between the one or more bridge controllers and the anchor or the tag.

In an aspect, the specific connectivity standard is the Matter open-source connectivity standard.

In another aspect, the secure network communication protocol between the one or more bridge controllers and each anchor and the tag that are part of the UWB sensor network is either a short-range wireless networking protocol or a wired networking protocol.

In yet another aspect, the short-range wireless networking protocol is one of the following: the IEEE 802.11 family of standards, a low-power mesh networking protocol based on the IEEE 802.15 family of standards, a short-range RF-based connectivity for portable personal devices based on IEEE 802.15.1, and a UWB short-range wireless networking protocol.

In an aspect, the vehicle communication network is based on one of the following: the IEEE 802.11 family of standards, a low-power mesh networking protocol based on the IEEE 802.15, the on-board diagnostic (OBD-II) communication protocol, the controller area network (CAN) bus standard, and the Ethernet family of computer networking technologies.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
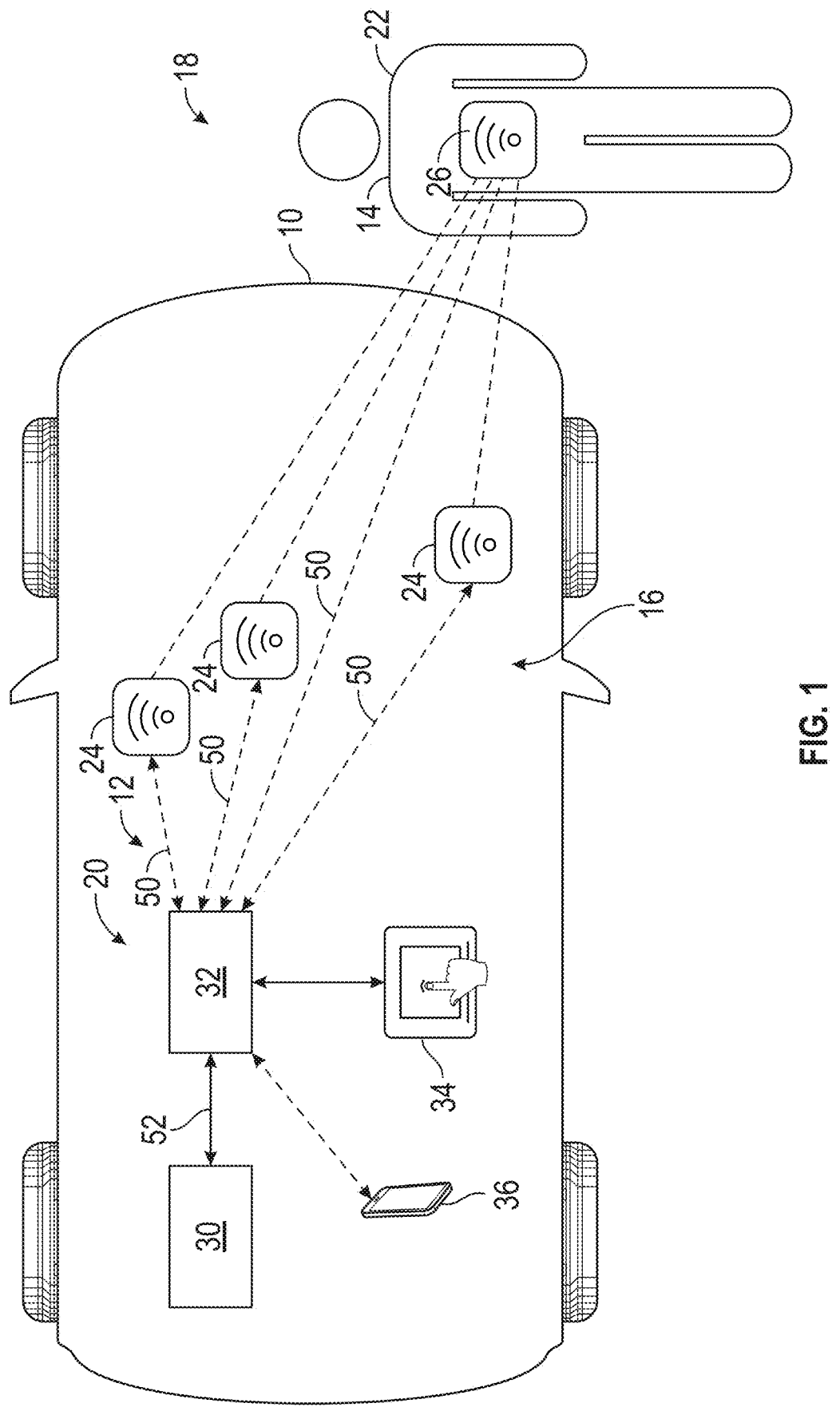
FIG. 1 illustrates a schematic diagram of a vehicle including the disclosed real-time locating system that includes an ultra-wide band (UWB) sensor network, one or more sub-network controllers, and one or more controllers, according to an exemplary embodiment.

Referring to FIG. 1, a vehicle 10 including the disclosed real-time locating system 12 is illustrated. The disclosed real-time locating system 12 determines a location of a target object 14 located in an interior cabin 16 or an environment 18 surrounding the vehicle 10 based on an ultra-wide band (UWB) sensor network 20. In the non-limiting embodiment as shown in the figures, the target object 14 is an individual 22. However, it is to be appreciated that FIG. 1 is merely exemplary in nature. Indeed, the target object 14 may be any type of stationary or moving object found in either the interior cabin 16 or the environment 18 such as, for example, a key fob, a smartphone, a smartwatch or other wearable device, another vehicle, or a bicycle. It is also to be appreciated that although a single target object 14 is illustrated, the real-time locating system 12 may include multiple tags 26 that are each mounted to different target objects 14.

Continuing to refer to FIG. 1, the vehicle 10 may be any type of vehicle such as, but not limited to, a sedan, a truck, sport utility vehicle, van, or motor home. Furthermore, although FIG. 1 illustrates a vehicle, it is to be appreciated that the real-time locating system 12 may be used in a variety of different applications. Specifically, the real-time locating system 12 may be used to determine the location of a target object located in any type of contained area such as, for example, a building or a parking garage.

The UWB sensor network 20 includes one or more anchors 24 in wireless communication with a tag 26 based on UWB radio frequency (RF) signals. The anchors 24 of the UWB sensor network 20 are mounted to the vehicle 10, while the tag 26 of the UWB sensor network 20 is mounted to the target object 14. The tag 26 is a mobile sensor that is moveably remote from the vehicle 10 that sends and receives sensor signals. Each anchor 24 of the UWB sensor network 20 is in wireless communication with the tag 26 to send and receive the sensor signals for tracking a location of the tag 26. The sensor signals indicate real-time distances between each anchor 24 that is mounted to the vehicle 10 and the tag 26. The one or more sub-network controllers 32 determine the location of the target object 14 based on the sensor signals that indicate the real-time distances between each anchor 24 and the tag 26 of the UWB sensor network 20.

In the embodiment as shown in FIG. 1, the real-time locating system 12 includes one or more controllers 30 in electronic communication with the UWB sensor network 20 by one or more sub-network controllers 32. The one or more controllers 30 is in electronic communication with the one or more sub-network controllers 32 based on either a short-range wireless networking protocol or a wired communication protocol. Some examples of the short-range wireless networking protocols include, but are not limited to, a wireless networking protocol based on the Institute of Electrical and Electronics Engineers (IEEE) 802.11 family of standards or a low-power mesh networking protocol based on the IEEE 802.15 family of standards. Some examples of the wired communication protocols include the on-board diagnostic (OBD-II) communication protocol and the controller area network (CAN) bus standard.

It is to be appreciated that the one or more controllers 30 are part of the vehicle 10 and support a specific connectivity standard that allows two or more Internet of Things (IoT) devices to communicate with one another. However, it is to be appreciated that the specific connectivity standard may not support UWB networks. One example of a connectivity standard that allows for IoT devices to communicate with one another and that does not support UWB networks is the Matter open-source connectivity standard, however, it is to be appreciated that the real-time locating system 12 is not limited to a particular connectivity standard. Merely by way of example, in another embodiment the specific connectivity standard is an IEEE 802.15.4-based specification for creating personal area networks such as Zigbee®.

The one or more sub-network controllers 32 represents a separate device from the vehicle 10 that is in electronic communication with the one or more controllers 30 of the vehicle 10. For example, in one embodiment, the one or more sub-network controllers 32 and the UWB sensor network 20 both represent an aftermarket system that a consumer purchases separately from the vehicle 10. In the exemplary embodiment as shown in FIG. 1, the one or more sub-networking controllers 32 include a human-machine interface (HMI) 34 that provides an interface for the occupant of the vehicle 10 to enter input. In the example as shown in FIG. 1, the HMI 34 is a touchscreen, however, it is to be appreciated that other devices may be used as well. In an embodiment, the one or more sub-networking controllers 32 are in wireless communication with a personal electronic device 36 associated with an occupant of the vehicle 10, where the occupant may enter the input using the personal electronic device 36. The personal electronic device 36 may be, for example, a smartphone or a laptop.

The one or more sub-network controllers 32 support the specific connectivity standard (e.g., the Matter open-source connectivity standard) and a secure network communication protocol for communicating with the anchors 24 and the tag 26. The secure network communication protocol is either a short-range wireless networking protocol or a wired networking protocol. Some examples of the short-range wireless networking protocols include, but are not limited to, the IEEE 802.11 family of standards, the low-power mesh network protocol based on the IEEE 802.15 family of standards, and the UWB short-range wireless network protocol. One example of the wired networking protocol is the Ethernet family of computer networking technologies.

The one or more sub-network controllers 32 execute a sub-network commissioning to discover and configure the one or more anchors 24 and the tag 26 into the UWB sensor network 20. Once the sub-network commissioning is complete, the one or more sub-network controllers 32 may receive the sensor signals from the one or more anchors 24 and the tag 26 to determine the location of the target object 14. The sub-network commissioning includes establishing a secure communication sub-network 50 between the one or more sub-network controllers 32 and each anchor 24 and the tag 26 that are part of the UWB sensor network 20 based on the secure network communication protocol. The sub-network commissioning also includes sub-network provisioning to establish communication between each anchor 24 and the tag 26 that are part of the UWB sensor network 20.

Figures 2, 3:
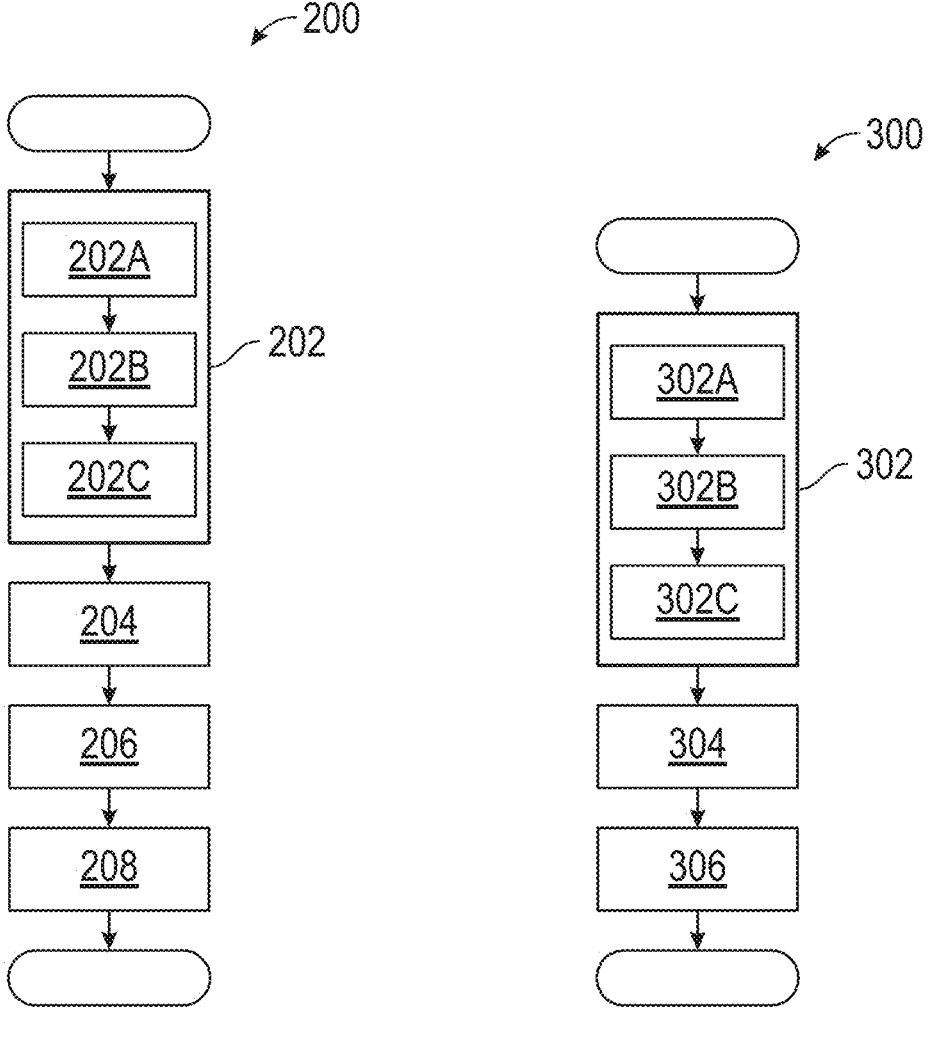
FIG. 2 is a process flow diagram illustrating a method for sub-network commissioning by the one or more sub-network controllers shown in FIG. 1, according to an exemplary embodiment.
FIG. 3 is a process flow diagram illustrating a method for performing the network commissioning by the one or more controllers shown in FIG. 1, according to an exemplary embodiment.

FIG. 2 illustrates an exemplary process flow diagram illustrating a method 200 for performing the sub-network commissioning by the one or more sub-network controllers 32. Referring to both FIGS. 1 and 2, the method 200 may begin at block 202. In block 202, the one or more sub-network controllers 32 establish the secure communication sub-network 50 between the one or more sub-network controllers 32 and each anchor 24 and the tag 26 that are part of the UWB sensor network 20 based on the secure network communication protocol. Specifically, establishing the secure communication sub-network 50 includes blocks 202A-202C.

In block 202A, the one or more sub-network controllers 32 receive a broadcast message from each anchor 24 and the tag 26 that are part of the UWB sensor network 20. The method 200 may then proceed to block 202B.

In block 202B, in response to receiving the broadcast message from each anchor 24 and the tag 26 that are part of the UWB sensor network 20, the one or more sub-network controllers 32 correlate each broadcast message received with the corresponding anchor 24 or tag 26 that is part of the UWB sensor network 20 based on node matching. In one non-limiting example, node matching is performed by an individual who scans a quick-response (QR) code (not shown) printed upon an exterior of each anchor 24 and the tag 26 that are part of the UWB sensor network 20 using a camera (not shown) that is part of the personal electronic device 36 in wireless communication with the one or more sub-network controllers 32. The one or more sub-network controllers 32 may correlate each broadcast message received with the corresponding anchor 24 or tag 26 that is part of the UWB sensor network 20 based on the QR code. In an alternative approach, node matching may be performed based on a unique media access control (MAC) address for each anchor 24 or tag 26 that is part of the UWB sensor network 20. The method 200 may then proceed to block 202C.

In block 202C, the one or more sub-network controllers 32 exchange security information with each anchor 24 or tag 26 that is part of the UWB sensor network 20 to establish the secure communication sub-network 50 between each anchor 24 and tag 26. The method 200 may then proceed to block 204.

In block 204, the one or more sub-network controllers 32 perform sub-network provisioning between each anchor 24 and the tag 26 that are part of the UWB sensor network 20. The sub-network provisioning includes configuring each anchor 24 and the tag 26 that are part of the UWB sensor network 20 based on a plurality of sub-network provisioning parameters. The plurality of sub-network provisioning parameters may include default or factory setting values or, in the alternative, an individual may enter customized values for one or more networking provisioning parameters. For example, the individual may enter customized values for the plurality of sub-network provisioning parameters by employing the HMI 34 that is part of the one or more sub-network controllers 32.

The plurality of sub-network provisioning parameters includes a two-way ranging protocol configuration, a role configuration, a network configuration, a backbone network communication protocol for the secure communication sub-network 50, and a communication channel. The two-way ranging protocol configuration is either a unicast or multicast transmission between the one or more sub-network controllers 32 and each anchor 24 and the tag 26 that are part of the UWB sensor network 20. Some examples of the two-way ranging protocol configuration include, but are not limited to, the Car Connectivity Consortium (CCC) Digital Key standard and the Nearby Interaction framework. The role configuration indicates the type of device that the one or more sub-network controllers 32 are in communication with, where the type of device indicates either an anchor 24 or a tag 26. The network configuration indicates the network identifier of each anchor 24 and the tag 26. One example of a network identifier is a MAC address associated with either one of the anchors 24 or the tag 26. Another example of a network identifier is a discriminator that is either provided in a QR code or broadcasted over a wireless network, such as a network based on a low-power mesh networking protocol based on the IEEE 802.15 family of standards. The backbone network communication protocol for the secure communication sub-network 50 indicates an underlying communications protocol between the one or more sub-network controllers 32 and the anchor 24 or the tag 26 such as, for example, the IEEE 802.11 family of standards, the low-power mesh networking protocol based on the IEEE 802.15 family of standards, the UWB wireless networking protocol, and the Ethernet family of computer networking technologies. The communication channel indicates the medium of communication between the one or more sub-network controllers 32 and the anchor 24 or the tag 26 such as, for example, a wired connection or a bandwidth range for a wireless connection.

The plurality of sub-network provisioning parameters may also include one or more optional parameters that include one or more of the following: an application layer protocol, a ranging interval, a communication channel, a ranging role, and any relevant network certificates required for communication between the one or more sub-network controllers 32 and the anchor 24 or the tag 26. Some examples of the application layer protocol include, but are not limited to, the hypertext transfer protocol (HTTP). Once each anchor 24 and the tag 26 that are part of the UWB sensor network 20 are configured based on the plurality of sub-network provisioning parameters, then each anchor 24 and the tag 26 join the secure communication sub-network 50, and the method 200 may then proceed to block 206.

In block 206, in response to determining each anchor 24 and the tag 26 that are part of the UWB sensor network 20 are configured based on the plurality of sub-network provisioning parameters, the one or more sub-network controllers 32 allow each anchor 24 and the tag 26 that are part of the UWB sensor network 20 to join the secure communication sub-network 50. For example, the one or more sub-network controllers 32 may allow for each anchor 24 and the tag 26 to join the secure communication sub-network 50 by sharing a network identifier associated with the secure communication sub-network 50. The method 200 may then proceed to block 208.

In block 208, the one or more anchors 24 and the tag 26 transmit information over the secure communication sub-network 50 to the one or more sub-network controllers 32 indicating the application programming interface (API) services that either an anchor 24 or the tag 26 supports. One example of an API service includes distance verification between an individual and a vehicle as an individual approaches a vehicle, where the vehicle's doors are unlocked based on the distance between the individual and the vehicle. Another example of the API service is precise smartphone in-vehicle localization for personal vehicle service customization. The anchors 24 transmit location coordinates to the one or more sub-network controllers 32, and the tag 26 transmits a distance measured between the tag 26 and each anchor 24 that is part of the UWB sensor network 20. The method 200 may then terminate.

Referring to FIG. 1, once the one or more sub-network controllers 32 have executed the sub-network commissioning to establish the secure communication sub-network 50 between the one or more sub-network controllers 32 and each anchor 24 and the tag 26 that are part of the UWB sensor network 20, the one or more controllers 30 may then perform network commissioning to establish a secure communication network 52 between the one or more controllers 30 and the one or more sub-network controllers 32. The network commissioning includes establishing the secure communication network 52 between the one or more sub-network controllers 32 and each anchor 24 and the tag 26 that are part of the UWB sensor network 20 based on either the short-range wireless networking protocol (e.g., the IEEE 802.11 family of standards or a low-power mesh networking protocol based on the IEEE 802.15 family of standards) or the wired communication protocol (e.g., OBD-II and CAN). The network commissioning also includes network provisioning to establish communication between the one or more controllers 30 and the one or more sub-network controllers 32.

FIG. 3 illustrates an exemplary process flow diagram illustrating a method 300 for performing the network commissioning by the one or more controllers 30. Referring to both FIGS. 1 and 2, the method 300 may begin at block 302. In block 302, the one or more controllers 30 establish the secure communication network 52 with the one or more sub-network controllers 32 based on either a short-range wireless networking protocol or a wired connection protocol. Specifically, establishing the secure communication network 52 includes blocks 302A-302C.

In block 302A, the one or more controllers 30 receive a broadcast message from the one or more sub-network controllers 32. It is to be appreciated that the sub-network controller 32 aggregates the sensor signals received from each anchor 24 and the tag 26 that are part of the UWB sensor network 20, and then broadcasts the sensor signals to the controller 30. The method 300 may then proceed to block 302B.

In block 302B, in response to receiving the broadcast message from the one or more sub-network controllers 32, the one or more controllers 30 then correlate the broadcast message with the one or more sub-network controllers 32 based on node matching. The method 300 may then proceed to block 302C.

In block 302C, the one or more controllers 30 exchange security information with the one or more sub-network controllers 32 to establish the secure communication network 52. The method 300 may then proceed to block 304.

In block 304, the one or more controllers 30 perform network provisioning with the one or more sub-network controllers 32. The network provisioning includes selecting an operational network configuration for the secure communication network 52, where the operational network configuration is either a short-range wireless networking protocol or a wired connection protocol. The network provisioning also includes configuring the Internet protocol (IP) over a selected operational network configuration. For example, if the selected operational network configuration is the CAN bus standard, then the internet protocol is enabled for CAN based messages. The method 300 may then proceed to block 306.

In block 306, the one or more controllers 30 then registers an API service corresponding to the UWB sensor network 20 with the vehicle 10, and also provides the vehicle 10 with access control to the UWB sensor network 20. The method 300 may then terminate.

Figure 4:
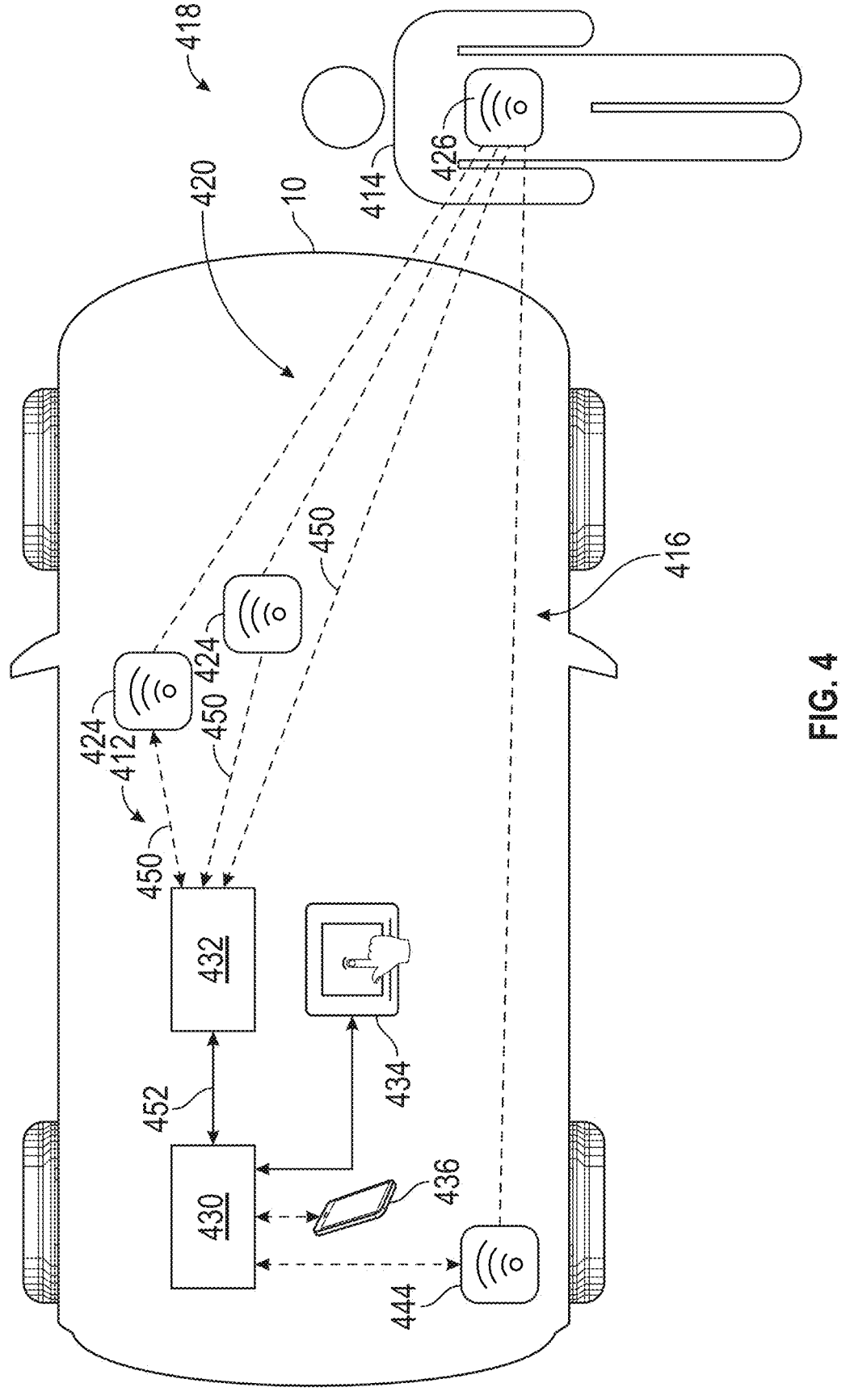
FIG. 4 illustrates an alternative embodiment of the real-time locating system that includes the UWB sensor network, one or more bridge controllers, and the one or more controllers, according to an exemplary embodiment.

FIG. 4 illustrates an alternative embodiment of a real-time locating system 412 that determines the location of a target object 414 located in an interior cabin 416 or an environment 418 surrounding the vehicle 10 based on UWB sensor network 420. The UWB sensor network 420 includes one or more anchors 424 in wireless communication with a tag 426 mounted to the target object 414. The real-time locating system 412 includes one or more controllers 430 and one or more bridge controllers 432.

The one or more controllers 430 are part of the vehicle 10 and support the specific connectivity standard that allows two or IoT devices to communicate with one another such as, for example, Matter. Unlike the embodiment as shown in FIG. 1, the one or more bridge controllers 432 are also part of the vehicle 10. Accordingly, the one or more controllers 430 are in electronic communication with the one or more bridge controllers 432 by a vehicle communication network 452. The vehicle communication network 452 allows electronic control units (ECUs) and other devices that are part of the vehicle 10 to communicate with one another. The vehicle communication network 452 is based on either the short-range wireless networking protocol (e.g., the IEEE 802.11 family of standards or a low-power mesh networking protocol based on the IEEE 802.15 family of standards) or the wired communication protocol (e.g., OBD-II, CAN, and Ethernet).

The one or more controllers 430 are in electronic communication with an HMI 434 that provides an interface for the occupant of the vehicle 10 to enter input. In an embodiment, the one or more controllers 430 are in wireless communication with a personal electronic device 436 associated with an occupant of the vehicle 10, where the occupant may enter the input using the personal electronic device 436.

In the embodiment as shown in FIG. 4, the UWB sensor network 420 may also include one or more existing or internal anchors 444 that are part of the vehicle 10 and are in electronic communication with the one or more controllers 430 based on either the short-range wireless networking protocol or the wired communication protocol. The remaining anchors 424 of the UWB sensor network 420 that are not internal anchors are in electronic communication with the one or more bridge controllers 432 based on the secure network communication protocol.

The one or more bridge controllers 432 support the specific connectivity standard (e.g., the Matter open-source connectivity standard) and the secure network communication protocol for communicating with the anchors 424 and the tag 426. The secure network communication protocol is either the short-range wireless networking protocol or the wired networking protocol. Some examples of the short-range wireless networking protocols include, but are not limited to, the IEEE 802.11 family of standards, the low-power mesh network protocol based on the IEEE 802.15 family of standards, a short-range RF-based connectivity for portable personal devices under IEEE 802.15.1, and the UWB short-range wireless networking protocol. One example of the wired networking protocol is the Ethernet family of computer networking technologies.

The one or more bridge controllers 432 execute the sub-network commissioning to discover and configure the one or more anchors 424 and the tag 426 into the UWB sensor network 420. Once the sub-network commissioning is complete, the one or more bridge controllers 432 may receive the sensor signals from the one or more anchors 424 and the tag 426 to determine the location of the target object 414. The sub-network commissioning includes establishing a secure communication sub-network 450 between the one or more bridge controllers 432 and each anchor 424 and the tag 426 that are part of the UWB sensor network 420 based on the secure network communication protocol. The sub-network commissioning also includes sub-network provisioning to establish communication between each anchor 424 and the tag 426 that are part of the UWB sensor network 420.

Figure 5:
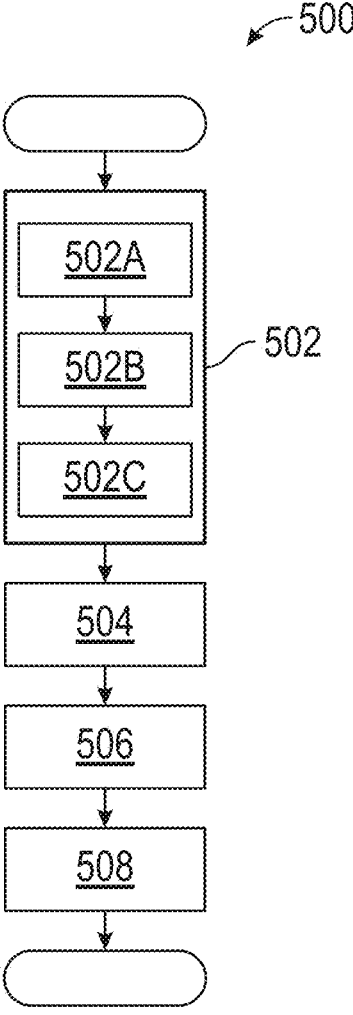
FIG. 5 is a process flow diagram illustrating a method for network commissioning by the one or more controllers shown in FIG. 4, according to an exemplary embodiment.

FIG. 5 illustrates an exemplary process flow diagram illustrating a method 500 for performing the sub-network commissioning by the one or more bridge controllers 432. Referring to both FIGS. 4 and 5, the method 500 may begin at block 502. In block 502, the one or more bridge controllers 432 establish the secure communication sub-network 450 between the one or more bridge controllers 432 and each anchor 424 and the tag 426 that are part of the UWB sensor network 420 based on the secure network communication protocol. Specifically, establishing the secure communication sub-network 450 includes blocks 402A-402C.

In block 502A, the one or more bridge controllers 432 receive a broadcast message from each anchor 424 and the tag 426 that are part of the UWB sensor network 420. The method 500 may then proceed to block 502B.

In block 502B, in response to receiving the broadcast message from each anchor 424 and the tag 426 that are part of the UWB sensor network 420, the one or more bridge controllers 432 correlate each broadcast message received with the corresponding anchor 424 or tag 426 that is part of the UWB sensor network 420 based on node matching. The method 500 may then proceed to block 502C.

In block 502C, the one or more bridge controllers 432 exchange security information with each anchor 424 or tag 426 that is part of the UWB sensor network 420 to establish the secure communication sub-network 450 between each anchor 424 and tag 426. The method 500 may then proceed to block 504.

In block 504, the one or more bridge controllers 432 perform sub-network provisioning between each anchor 424 and the tag 426 that are part of the UWB sensor network 420. The sub-network provisioning includes configuring each anchor 424 and the tag 426 that are part of the UWB sensor network 420 based on the plurality of sub-network provisioning parameters. Once each anchor 424 and the tag 426 that are part of the UWB sensor network 420 are configured based on the plurality of sub-network provisioning parameters, then each anchor 424 and the tag 426 join the secure communication sub-network 450, and the method 500 may then proceed to block 506.

In block 506, in response to determining each anchor 424 and the tag 426 that are part of the UWB sensor network 420 are configured based on the plurality of sub-network provisioning parameters, the one or more bridge controllers 432 allow each anchor 424 and the tag 426 that are part of the UWB sensor network 420 to join the secure communication sub-network 450. The method 500 may then proceed to block 508.

In block 508, the one or more anchors 424 and the tag 426 transmit information over the secure communication sub-network 450 to the one or more bridge controllers 432 indicating the API services that either an anchor 424 or the tag 426 supports. The anchors 424 transmit location coordinates to the one or more bridge controllers 432, and the tag 426 transmits a distance measured between the tag 426 and each anchor 424 that is part of the UWB sensor network 420. The method 500 may then terminate.

Referring generally to the figures, the disclosed object real-time locating system provides various technical effects and benefits. Specifically, the real-time locating system provides an approach for integrating a UWB sensor network into a vehicle that does not currently support UWB networks. It is to be appreciated that the vehicle may support a connectivity standard for allowing IoT devices to communicate with one another but does not support UWB networks, such as the Matter open-source connectivity standard. In some embodiments, the real-time locating system includes one or more sub-network controllers that are provided as an aftermarket component that allows for the vehicle to communicate with the UWB sensor network.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A real-time locating system determining a location of a target object located in an interior cabin or an environment surrounding a vehicle, the real-time locating system comprising:

an ultra-wide band (UWB) sensor network including one or more anchors mounted to the vehicle that are in wireless communication with a tag mounted to the target object, wherein each anchor sends and receives sensor signals that indicate real-time distances between each anchor and the tag;

one or more controllers that are part of the vehicle that support a specific connectivity standard that allows two or more Internet of Things (IoT) devices to communicate with one another; and one or more sub-network controllers in electronic communication with the one or more controllers, wherein a secure communication sub-network exists between the one or more sub-network controllers and each anchor and the tag that are part of the UWB sensor network based on a secure network communication protocol, and wherein the one or more sub-network controllers include one or more processors that execute a sub-network commissioning that includes:

establishing the secure communication sub-network between the one or more sub-network controllers and each anchor and the tag that are part of the UWB sensor network;

performing sub-network provisioning between each anchor and the tag that are part of the UWB sensor network, wherein the sub-network provisioning includes configuring each anchor and the tag based on a plurality of sub-network provisioning parameters; and in response to determining each anchor and the tag are configured based on the plurality of sub-network provisioning parameters, allow each anchor and the tag that are part of the UWB sensor network to join the secure communication sub-network.

2. The real-time locating system of claim 1, wherein the plurality of sub-network provisioning parameters includes the following: a two-way ranging protocol configuration, a role configuration, a network configuration, a backbone network communication protocol for the secure communication sub-network, and a communication channel.

3. The real-time locating system of claim 2, wherein the plurality of sub-network provisioning parameters includes one or more of the following: an application layer protocol, a ranging interval, a communication channel, a ranging role, and any relevant network certificates required for communication between the one or more sub-network controllers and the one or more anchors or the tag.

4. The real-time locating system of claim 1, wherein the specific connectivity standard is the Matter open-source connectivity standard.

5. The real-time locating system of claim 1, wherein the one or more sub-network controllers and the UWB sensor network both represent an aftermarket system that a consumer purchases separately from the vehicle.

6. The real-time locating system of claim 1, wherein the secure network communication protocol between the one or more sub-network controllers and each anchor and the tag that are part of the UWB sensor network is either a short-range wireless networking protocol or a wired networking protocol.

7. The real-time locating system of claim 6, wherein the short-range wireless networking protocol is one of the following: the Institute of Electrical and Electronics Engineers (IEEE) 802.11 family of standards, a low-power mesh networking protocol based on the IEEE 802.15 family of standards, and a UWB short-range wireless networking protocol.

8. The real-time locating system of claim 6, wherein the short-range wireless networking protocol is the Ethernet family of computer networking technologies.

9. The real-time locating system of claim 1, wherein the one or more controllers include one or more processors that execute instructions to perform network commissioning to establish a secure communication network between the one or more controllers and the one or more sub-network controllers.

10. The real-time locating system of claim 9, wherein the network commissioning includes:

establish, by the one or more controllers, the secure communication network with the one or more sub-network controllers based on either a short-range wireless networking protocol or a wired connection protocol.

11. The real-time locating system of claim 10, wherein the network commissioning includes:

perform network provisioning with the one or more sub-network controllers, wherein the network provisioning includes selecting an operational network configuration and configuring an internet protocol (IP) over a selected operational network configuration.

12. The real-time locating system of claim 11, wherein the network commissioning includes:

registering an application programming interface (API) service corresponding to the UWB sensor network with the vehicle; and providing the vehicle with access control to the UWB sensor network.

13. The real-time locating system of claim 1, wherein establishing the secure communication sub-network includes:

receive a broadcast message from each anchor and the tag that are part of the UWB sensor network;

in response to receiving the broadcast message from each anchor and the tag that are part of the UWB sensor network, correlate each broadcast message received with the corresponding anchor or tag that is part of the UWB sensor network based on node matching; and exchange security information with each anchor or the tag that is part of the UWB sensor network to establish the secure communication sub-network between each anchor and the tag.

14. A real-time locating system determining a location of a target object located in an interior cabin or an environment surrounding a vehicle, the real-time locating system comprising:

a UWB sensor network including one or more anchors mounted to the vehicle that are in wireless communication with a tag mounted to the target object, wherein each anchor sends and receives sensor signals that indicate real-time distances between each anchor and the tag;

one or more controllers that are part of the vehicle that support a specific connectivity standard that allows two or more IoT devices to communicate with one another; and one or more bridge controllers that are part of the vehicle and are in electronic communication with the one or more controllers by a vehicle communication network, wherein a secure communication sub-network exists between the one or more bridge controllers and each anchor and the tag that are part of the UWB sensor network based on a secure network communication protocol, and wherein the one or more bridge controllers include one or more processors that execute a sub-network commissioning that includes:

establishing the secure communication sub-network between the one or more bridge controllers and each anchor and the tag that are part of the UWB sensor network;

performing sub-network provisioning between each anchor and the tag that are part of the UWB sensor network, wherein the sub-network provisioning includes configuring each anchor and the tag based on a plurality of sub-network provisioning parameters; and in response to determining each anchor and the tag are configured based on the plurality of sub-network provisioning parameters, allow each anchor and the tag that are part of the UWB sensor network to join the secure communication sub-network.

15. The real-time locating system of claim 14, wherein the plurality of sub-network provisioning parameters includes the following: a two-way ranging protocol configuration, a role configuration, a network configuration, a backbone network communication protocol for the secure communication sub-network, and a communication channel.

16. The real-time locating system of claim 15, wherein the plurality of sub-network provisioning parameters includes one or more of the following: an application layer protocol, a ranging interval, a communication channel, a ranging role, and any relevant network certificates required for communication between the one or more bridge controllers and the anchor or the tag.

17. The real-time locating system of claim 14, wherein the specific connectivity standard is the Matter open-source connectivity standard.

18. The real-time locating system of claim 14, wherein the secure network communication protocol between the one or more bridge controllers and each anchor and the tag that are part of the UWB sensor network is either a short-range wireless networking protocol or a wired networking protocol.

19. The real-time locating system of claim 18, wherein the short-range wireless networking protocol is one of the following: the IEEE 802.11 family of standards, a low-power mesh networking protocol based on the IEEE 802.15 family of standards, a short-range RF-based connectivity for portable personal devices based on IEEE 802.15.1, and a UWB short-range wireless networking protocol.

20. The real-time locating system of claim 14, wherein the vehicle communication network is based on one of the following: the IEEE 802.11 family of standards, a low-power mesh networking protocol based on the IEEE 802.15, the on-board diagnostic (OBD-II) communication protocol, the controller area network (CAN) bus standard, and the Ethernet family of computer networking technologies.

* * * * *